US009514398B2

(12) United States Patent
Akiyama et al.

(10) Patent No.: US 9,514,398 B2
(45) Date of Patent: Dec. 6, 2016

(54) SECURELY PRINTING A DOCUMENT

(71) Applicant: International Business Machines Corporation, Armonk, NY (US)

(72) Inventors: Kazuhito Akiyama, Tokyo (JP); Sanehiro Furuichi, Tokyo (JP); Masami Tada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/641,465

(22) Filed: Mar. 9, 2015

(65) Prior Publication Data

US 2015/0278669 A1    Oct. 1, 2015

(30) Foreign Application Priority Data

Mar. 28, 2014    (JP) .................................. 2014-070237

(51) Int. Cl.
*G06K 15/00* (2006.01)
*G06F 3/12* (2006.01)
*H04N 1/00* (2006.01)

(52) U.S. Cl.
CPC ......... *G06K 15/4095* (2013.01); *G06F 3/1222* (2013.01); *G06F 3/1238* (2013.01); *G06F 3/1288* (2013.01); *H04N 1/00204* (2013.01); *H04N 1/00244* (2013.01); *H04N 1/00838* (2013.01); *H04N 2201/0094* (2013.01)

(58) Field of Classification Search
USPC ...................................................... 358/1.14
See application file for complete search history.

(56) References Cited

U.S. PATENT DOCUMENTS

| 2002/0083114 | A1* | 6/2002 | Mazzagatte | G06F 3/1204 718/100 |
| 2003/0101342 | A1* | 5/2003 | Hansen | G06F 21/35 713/167 |
| 2014/0002845 | A1* | 1/2014 | Gutnik | G06F 21/608 358/1.14 |

FOREIGN PATENT DOCUMENTS

| JP | 2003308194 A | 10/2003 |
| JP | 2004005586 A | 1/2004 |
| JP | 2005144844 A | 6/2005 |
| JP | 2006074527 A | 3/2006 |
| JP | 2006195811 A | 7/2006 |

(Continued)

OTHER PUBLICATIONS

Pending application 2014070237, entitled: "System, Computer, Method, and Program for Printing According to Security Requirements", filed on Mar. 28, 2014.

*Primary Examiner* — Ngon Nguyen
(74) *Attorney, Agent, or Firm* — L. Jeffrey Kelly

(57) ABSTRACT

Securely printing a document. Receiving, by a server computer, a request from a client computer to allocate a printer satisfying a set of security requirements. Allocating, by the server computer, a printer that will print document data according to the received set of security requirements and that is accessible by the client computer. Transmitting to the client computer, by the server computer, an identification of the allocated printer. Transmitting to the allocated printer, by the server computer, the received set of security requirements. Receiving from the client computer, by the server computer, a printing instruction including document data for printing to the allocated printer. Transmitting to the allocated printer, by the server computer, the received document data to print.

20 Claims, 10 Drawing Sheets

(56) References Cited

FOREIGN PATENT DOCUMENTS

| JP | 2008073973 A | 4/2008 |
| JP | 2011086055 A | 4/2011 |
| JP | 2011086059 A | 4/2011 |
| JP | 2012068699 A | 4/2012 |

* cited by examiner

GROUP MANAGEMENT TABLE

| Group ID | Owner | Participant | Security Setting | Printer ID | Waiting Job | Group Reservation |
|---|---|---|---|---|---|---|
| RGN001 | User A (PC X) | — | • IEEE 2600 Level: 2600.2<br>• HDD: Delete / Encrypt<br>• Password Level: Max<br>• Other job: Deny | MFP001 | Job401(User C) | — |
| RGN002 | User B (PC Y) | User D<br>User E | • IEEE 2600 Level: N/A<br>• HDD: Encrypt<br>• Password Level: No<br>• Other job: Allow | MFP002<br>MFP003 | Job201(User A)<br>Job301(User B) | — |
| RGN003 | User C (PC Z) | — | • IEEE 2600 Level: 2600.4<br>• HDD: Encrypt<br>• Password Level: Min<br>• Other job: Deny neighbor<br>• Function: disable fax / scanner | MFP005<br>MFP006 | — | 2014/2/15 13:00~15:00 |

*FIG. 3*

DEVICE MANAGEMENT TABLE

| Printer ID | Model Information | Installation Location | Group ID | Executed Job | Configurable Item | Multi-Functions |
|---|---|---|---|---|---|---|
| MFP001 | Company A Model Number 0123-45678 | Office A, 7F, North Side | RGN001 | Job001(User A) Job002(User A) | HDD(Encrypt/Delete) Password(No/Min/Med/Max) | Fax: enable Scan: enable |
| MFP002 | Company A Model Number 0124-23456 | Office A, 7F, North Side | RGN002 | Job001(User B) Job101(User E) | HDD(Encrypt/Delete) Password(No/Min/Max) | Fax: N/A Scan: N/A |
| MFP003 | Company B Model Number A001-23456 | Office A, 7F, North Side | RGN002 | Job001(User D) Job002(User D) | HDD(Encrypt) Password(No/Min) | Fax: enable Scan: enable |
| MFP004 | Company B Model Number A002-54321 | Office A, 7F, South Side | — | — | HDD(N/A) Password(N/A) | Fax: enable Scan: disable |
| MFP005 | Company C Model Number 5555-12000 | Office A, 5F, South Side | RGN003 | Job101(User C) | HDD(Encrypt/Delete) Password(No/Min) | Fax: disable Scan: disable |
| MFP006 | Company C Model Number 5556-1200C | Office A, 5F, South Side | RGN003 | — | HDD(Encrypt) Password(No/Min/Max) | Fax: disable Scan: N/A |

*FIG. 4*

WAITING JOB MANAGEMENT TABLE

| Job ID | Security Requirements | Deferment Conditions |
|---|---|---|
| Job201(User A) | • IEEE 2600 Level: 2600.2<br>• HDD: Delete / Encrypt<br>• Password Level: Max<br>• Other job: Deny | Any Location<br>Within 30 Minutes |
| Job301(Use B) | • IEEE 2600 Level: 2600.3<br>• HDD: Encrypt<br>• Password Level: Max<br>• Other job: Deny | Neighborhood Device Only<br>Within 60 Minutes |
| Job401(User C) | • IEEE 2600 Level: N/A<br>• HDD: N/A<br>• Password Level: N/A<br>• Other job: Allow | Limited to MFP001<br>Unlimited Time |

*FIG. 5*

SECURELY PRINTING A DOCUMENT

BACKGROUND

The present invention relates to a system, a computer, a method, and a program for printing according to security requirements.

A general printer is provided with various security functions, such as automatic deletion of document data and input of password for printing, to prevent leakage of confidential information, and techniques for further improving the confidentiality are proposed. For example, in one conventional technique, a deletion process of each printable job is selectively set from a plurality of types of deletion modes. Furthermore, for example, in another conventional technique, measurement of elapsed time is started when a print job is accepted. The print job is executed if user authentication is performed before a lapse of set execution waiting time, and data of the print job is saved if the execution waiting time has passed before the user authentication is performed.

SUMMARY

Embodiments of the present invention disclose a method, computer program product, and system for securely printing a document including receiving, by a server computer, a request from a client computer to allocate a printer satisfying a set of security requirements, allocating, by the server computer, a printer that will print document data according to the received set of security requirements and that is accessible by the client computer, transmitting to the client computer, by the server computer, an identification of the allocated printer, transmitting to the allocated printer, by the server computer, the received set of security requirements, receiving from the client computer, by the server computer, a printing instruction including document data for printing to the allocated printer, and transmitting to the allocated printer, by the server computer, the received document data to print.

When a plurality of users share and use a printer, one user may use the printer to print a confidential document, and another user may use the printer to print a non-confidential document. Therefore, when the security functions are set printer by printer, printing of the non-confidential document is also subject to restrictions of the security functions if various security functions are validated. There can also be an operation mode in which a plurality of printers are used for different purposes, and a printer dedicated to confidential documents is installed. However, the frequency and the quantity of printing confidential documents vary, and the confidential level may be divided into several stages. Therefore, the operation mode of installing the printer dedicated to confidential documents all the time is inefficient.

An object of the present invention is to enable printing under security requirements necessary for printing document data without reduction in the use efficiency of a printer.

To attain the object, the present invention may be implemented by the following system. The system is a system in which a client computer and a server computer are connected through a communication line, the client computer including: a request module configured to request the server computer to allocate a printer satisfying security requirements necessary for printing document data; and a transmission module configured to transmit, to the server computer, a printing instruction for printing the document data in the printer allocated according to the request by the request module, the server computer including: a generation module configured to generate a group that includes one or a plurality of printers satisfying the security requirements and that accepts the printing instruction for instructing printing based on the security requirements, in response to the request by the request module and based on a table specifying security functions included in printers usable by a user; a notification module configured to notify the client computer of information on the printer allocated to the group; an instruction module configured to instruct the printer allocated to the group to set the security requirements; and a forwarding module configured to forward the printing instruction transmitted from the transmission module to the printer allocated to the group.

Preferably, if a group including a printer satisfying the security requirements is already generated when the request module makes the request, the notification module of the server computer notifies the client computer of the information on the printer.

More preferably, the client computer further includes a display module configured to display the information on the allocated printer if the allocation of the printer by the generation module of the server computer is successful and to display a screen for the user to select one of cancellation and deferment of printing of the document data if the allocation of the printer has failed.

More preferably, if the deferment of printing of the document data is selected, the forwarding module of the server computer suspends forwarding the printing instruction for instructing printing of the document data and registers, as a waiting instruction, the printing instruction in the group generated by the generation module.

Preferably, the generation module of the server computer abandons the group when printing is completed for all printing instructions accepted by the group, and the instruction module of the server computer instructs the printer allocated to the group to initialize setting related to security when the group is abandoned.

More preferably, when a plurality of document data with the same security requirements are to be printed within a certain time, the group accepting the printing instruction of the plurality of document data does not accept another printing instruction different from the printing instruction until printing of the plurality of document data is completed.

More preferably, in a case of generating the group, the generation module of the server computer also allocates another printer provided near the printer satisfying the security requirements to the group.

Preferably, the client computer further includes an acceptance module configured to accept operation by the user, and if a location of the printer allocated to the group is not near the user, the acceptance module accepts operation for selecting one of deferring printing of the document data and printing by another printer provided at a location away from the user.

The present invention may be implemented by the following system. The system includes: an allocation module configured to allocate a printer satisfying security requirements necessary for printing document data among printers usable by a user; an instruction module configured to instruct the printer allocated by the allocation module to set the security requirements; and a printing instruction transmission module configured to transmit, to the printer, a printing instruction for printing the document data in the printer allocated by the allocation module.

Furthermore, the present invention may be implemented by the following computer. The computer is a server computer connected through a communication line to a client computer and to a printer configured to execute printing, the server computer including: a generation module configured to generate a group that includes one or a plurality of printers satisfying security requirements necessary for printing document data and that accepts a printing instruction for instructing printing based on the security requirements, in response to a request by the client computer and based on a table specifying security functions included in printers usable by a user; a notification module configured to notify the client computer of information on the printer allocated to the group; an instruction module configured to instruct the printer allocated to the group to set the security requirements; and a forwarding module configured to receive, from the client computer, the printing instruction for printing the document data in the printer allocated to the group and to forward the printing instruction to the printer.

The present invention may also provide a method including the steps of: allocating a printer satisfying security requirements necessary for printing document data among printers usable by a user; instructing the allocated printer to set the security requirements; and transmitting, to the printer, a printing instruction for printing the document data in the allocated printer.

Furthermore, the present invention may also provide a program for causing a server computer, connected through a communication line to a client computer and to a printer configured to execute printing, to implement the functions of: generating a group that includes one or a plurality of printers satisfying security requirements necessary for printing document data and that accepts a printing instruction for instructing printing based on the security requirements, in response to a request by the client computer and based on a table specifying security functions included in printers usable by a user; notifying the client computer of information on the printer allocated to the group; instructing the printer allocated to the group to set the security requirements; and receiving, from the client computer, the printing instruction for printing the document data in the printer allocated to the group and forwarding the printing instruction to the printer.

According to the present invention, printing under security requirements necessary for printing document data is enabled, and reduction in the use efficiency of a printer is suppressed.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which:

FIG. 3 is a diagram showing an example of a group management table;

FIG. 4 is a diagram showing an example of a device management table;

FIG. 5 is a diagram showing an example of a waiting job management table;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Hereinafter, an embodiment of the present invention will be described in detail with reference to the attached drawings.

System Configuration

Figure 1:
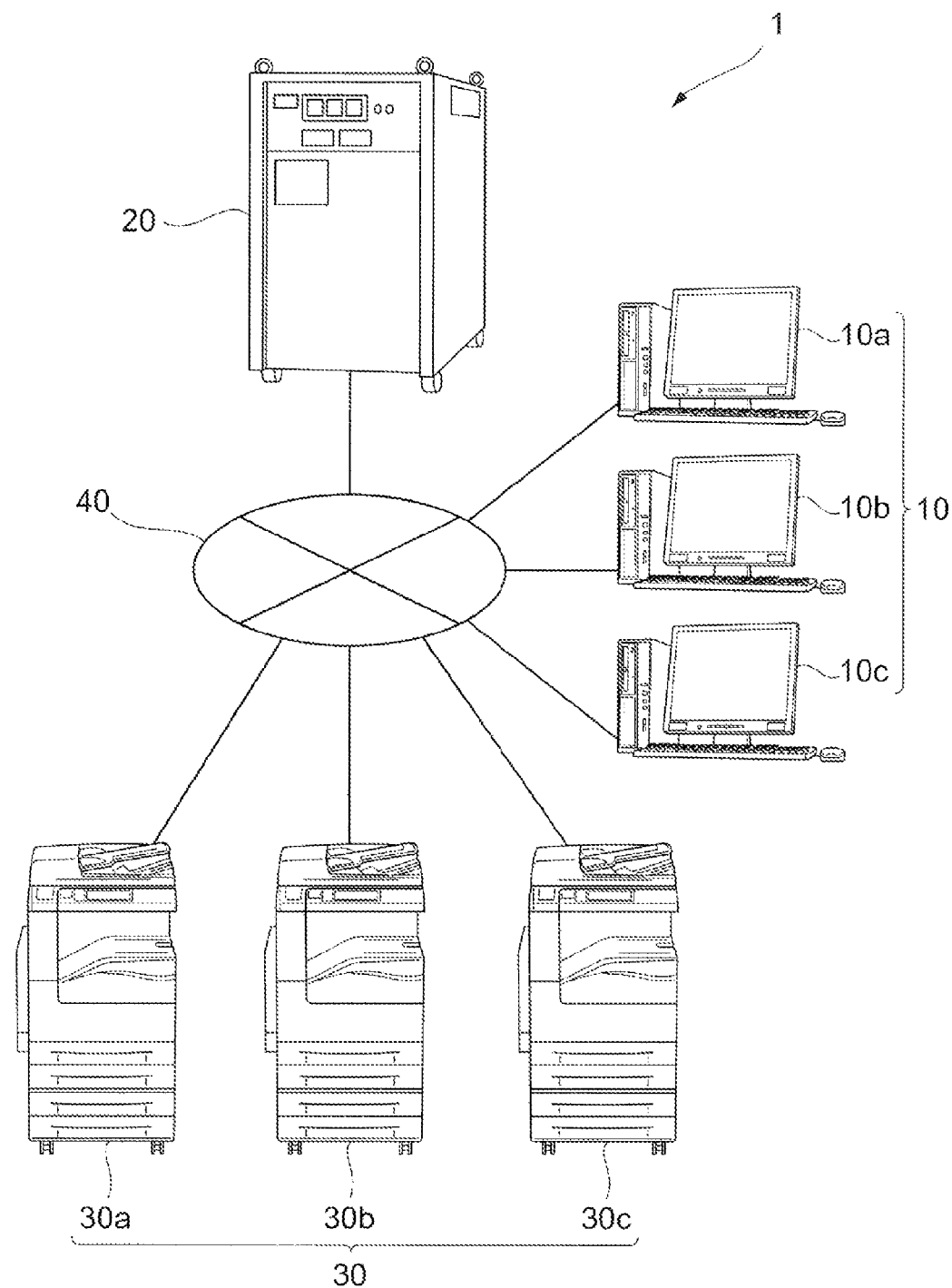
FIG. 1 is a diagram showing an example of a schematic configuration of a printing system according to the present embodiment.

First, an overall configuration of a printing system 1 will be described. FIG. 1 is a diagram showing an example of a schematic configuration of the printing system 1 according to an embodiment. As illustrated, the printing system 1 includes client terminals 10 (client terminals 10a, 10b, and 10c), a management server 20, and printers 30 (printers 30a, 30b, and 30c) connected through a network 40. Although FIG. 1 shows three client terminals 10, it is only necessary that the printing system 1 include one or more client terminals 10. Similarly, although FIG. 1 shows three printers 30, it is only necessary that the printing system 1 include one or more printers 30.

The client terminal 10 as an example of a client computer is a terminal operated by a user to print data, such as an image and a document, and may be a PC (Personal Computer) or a portable information terminal (so-called smartphone, tablet terminal, or the like), for example. The client terminal 10 determines security requirements necessary for printing according to the content and the like of the document data to be printed and requests the management server 20 to allocate the printer 30 satisfying the necessary security requirements. The client terminal 10 generates a print job according to the allocated printer 30 and transmits the print job to the management server 20. The print job is data including document data to be printed and a control command describing the setting in the printing process, and the printer 30 executes the printing process on a print-job-by-print-job basis. In the present embodiment, the print job is used as an example of a printing instruction.

The management server 20 as an example of a server computer allocates the printer 30 according to an allocation request of the printer 30 received from the client terminal 10. The management server 20 also instructs the allocated printer 30 to validate security functions necessary for printing and forwards the print job received from the client terminal 10 to the printer 30. Here, the management server 20 creates a group of specific printers 30 (hereinafter, called printing group) among the printers 30 usable by the user, accessible by the user, or available to the user, provided in the printing system 1. The printers 30 satisfying the security requirements requested by the allocation request are allocated to the printing group, and the printing group includes one or a plurality of printers 30. While the printing group accepts a print job for instructing printing based on the security requirements requested by the allocation request, the printing group does not accept a print job with different security requirements. The print job with different security requirements is, for example, a print job requiring other security functions that printers in the print group cannot satisfy, a print job not requiring the security functions, or the like.

The management server 20 reflects the setting of the security requirements specified in the printing group on the printers 30 allocated to the printing group and transmits the print job to the printers 30. The security settings of a plurality of printing groups are not reflected on one printer 30. The management server 20 allocates an arbitrary printer 30 in which the security functions are not validated, when the security functions are not necessary based on the allocation request of the printer 30.

The printer 30 is an apparatus that forms and outputs an image to a recording medium, such as paper. The printer 30 receives the print job created by the client terminal 10 through the management server 20 and forms an image on the recording medium based on the received print job. Although a printer with only print functions may be used as the printer 30, a printer with other image processing functions, such as copy functions, scan functions, and facsimile functions, in addition to the print functions may also be used.

The network 40 as an example of a communication line is communication means used for information communication between the client terminals 10, the management server 20, and the printers 30 and is, for example, a LAN (Local Area Network). However, although the client terminals 10, the management server 20, and the printers 30 are connected to the network 40 in the present embodiment, the configuration is not limited to this. For example, a network connecting the client terminals 10 and the management server 20 and a network connecting the management server 20 and the printers 30 may exist as individual networks.

Functional Configuration of Printing System

Figure 2:
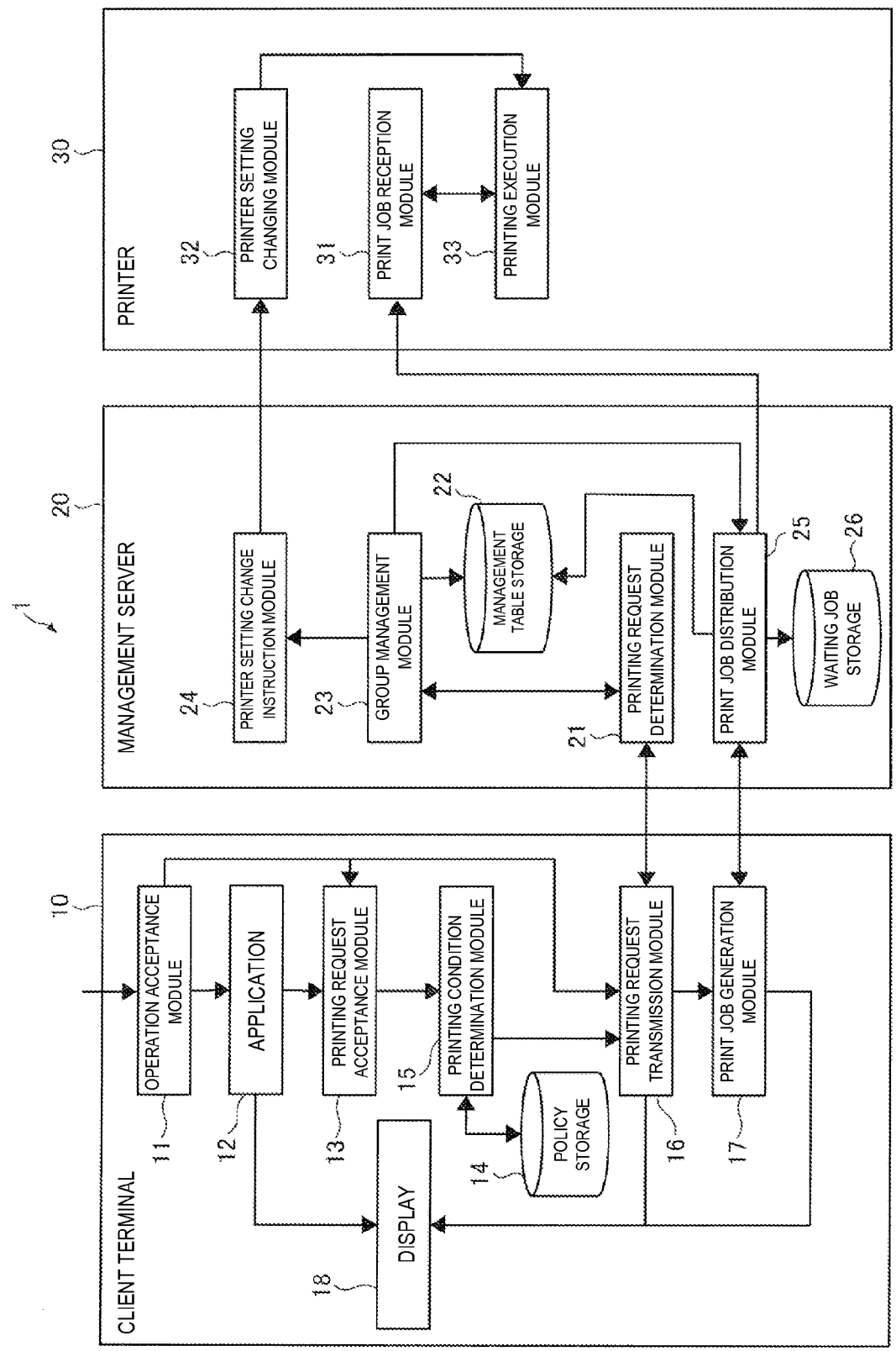
FIG. 2 is a block diagram showing a functional configuration example of the printing system according to the present embodiment.

Next, a functional configuration of the printing system 1 will be described. FIG. 2 is a block diagram showing a functional configuration example of the printing system 1 according to an embodiment. Although the example of FIG. 2 illustrates one client terminal 10 and one printer 30, the other client terminals 10 and the other printers 30 included in the printing system 1 may also have the same configurations.

First, a functional configuration of the client terminal 10 will be described. The client terminal 10 includes: an operation acceptance module 11 that accepts operation input from the user; an application 12 that outputs document data to request printing; a printing request acceptance module 13 that accepts the printing request to make a request for determination of printing conditions; and a policy storage 14 that stores a security policy defined in advance by a system administrator or the like. The client terminal 10 further includes: a printing condition determination module 15 that determines security requirements necessary for printing the document data; a printing request transmission module 16 that requests the management server 20 to allocate the printer 30 satisfying the necessary security requirements; a print job generation module 17 that generates a print job according to the allocated printer 30; and a display module 18 that displays various screens for the user.

The operation acceptance module 11 as an example of an acceptance module receives operation input from the user. For example, the operation acceptance module 11 accepts operation input for activating the application 12, operation input for executing printing after activating the application 12, and the like.

The application 12 is application software used for printing document data and is activated by the operation of the user. After the activation, the application 12 displays a screen for accepting the operation of executing printing on the display module 18. When the user performs the operation for executing printing, the application 12 outputs the document data to be printed to the printing request acceptance module 13 and requests printing.

The printing request acceptance module 13 accepts the printing request from the application 12. The printing request acceptance module 13 outputs the document data acquired from the application 12 to the printing condition determination module 15 to ask the printing condition determination module 15 to determine printing conditions.

The policy storage 14 stores a security policy defined in advance by the system administrator or the like. The security policy defines the content of the security setting necessary for the printer 30 to print the document data, according to the information on the document data to be printed. The security policy defines security settings necessary according to a confidential level specified according to information or the like such as a specific keyword included in the printed document (for example, characters "Confidential" indicating confidentiality or the like), a classification label indicating attributes of the document data (document file), a type of application used to create the document data, and a download source when the document data is downloaded through the Internet.

Examples of the defined content of a security setting include immediate deletion of the document data after printing, restriction of the client terminals 10 that can access the printer 30, usage restriction of other functions such as facsimile functions and scan functions, settings for performing printing when a correct password is input after prompting the user to input the password for printing, and the like. The security policy is used when the printing condition determination module 15 determines the security requirements necessary for printing the document data.

The printing condition determination module 15 refers to the security policy stored in the policy storage 14 based on the information on the document data transmitted from the application 12 and determines the security requirements necessary for printing the document data. The printing condition determination module 15 outputs the security requirements obtained by the determination and the document data to the printing request transmission module 16.

The printing request transmission module 16 as an example of a request module requests a printing request determination module 21 of the management server 20 described later to allocate the printer 30 satisfying the security requirements provided from the printing condition determination module 15. As a result of the request, if information on the allocated printer 30 is received from the printing request determination module 21, the printing request transmission module 16 determines that the allocation of the printer 30 is successful and asks the print job generation module 17 to generate a print job. Here, the printing request transmission module 16 outputs the information on the allocated printer 30 and the document data to the print job generation module 17.

On the other hand, as a result of the request, if a notification indicating that the allocation of the printer 30 is not possible is received from the printing request determination module 21, the printing request transmission module 16 causes the display module 18 to display a screen for the user to select one of deferment and cancellation of printing. If the user selects the deferment of printing, the display module 18 further displays a screen for designating content of conditions for the deferment, such as time permitted by the user (hereinafter, called waiting time), which is time that the user waits before the execution of printing, and a location of printing after waiting (more specifically, the printer 30 that executes printing). After the deferment of printing is selected, the printing request transmission module 16 requests the printing request determination module 21 again to allocate the printer 30 satisfying the security requirements by adding the information indicating the deferment and the content if the conditions for the deferment are input. Hereinafter, the deferment of printing and the content of the conditions for the deferment may be collectively called deferment conditions.

The print job generation module 17 as an example of a transmission module generates a print job based on the information on the printer 30 and the document data acquired from the printing request transmission module 16 and transmits the generated print job to a print job distribution module 25 of the management server 20 described later. When a notification of the completion of the printing process for the print job is received from the print job distribution module 25, the print job generation module 17 causes the display module 18 to display position information and the like on the printer 30 that has executed the printing process. Even if the print job provided with the deferment conditions is transmitted from the print job generation module 17 to the print job distribution module 25, the printing process is held without being executed immediately.

Hereinafter, the print job provided with the deferment conditions may be called a waiting job.

The display module 18 displays various screens for the user. Here, the display module 18 displays, for example, a screen for accepting operation for executing printing or a screen for the user to select cancellation or deferment of printing. The display module 18 also displays, for example, a screen indicating the position information and the like on the printer 30 that has executed the printing process of the print job.

Next, a functional configuration of the management server 20 will be described. The management server 20 includes: the printing request determination module 21 that receives the allocation request of the printer 30 from the client terminal 10; a management table storage 22 that stores various tables described later; a group management module 23 that searches for a printing group satisfying provided security requirements; a printer setting change instruction module 24 that instructs the printer 30 to change the security setting; the print job distribution module 25 that transmits the print job to the printer 30; and a waiting job storage 26 that stores the waiting job.

When the allocation request of the printer 30 is received from the printing request transmission module 16 of the client terminal 10, the printing request determination module 21 asks the group management module 23 to create a printing group satisfying the provided security requirements.

The management table storage 22 stores various tables such as, for example, a group management table, a device management table, and a waiting job management table. The group management table is a table indicating information on the printing groups created by the group management module 23. The device management table is a table indicating information on the printers 30 existing in the printing system 1. The waiting job management table is a table indicating information on the waiting jobs provided with the deferment conditions. The specific content of each table will be described later. In the present embodiment, the device management table is used as an example of a table provided with security functions included in the printers 30 usable by the users accessible by the users, or available to the users.

When the printing request determination module 21 requests the group management module 23 as an example of a print group generation module, a notification module, and a printer allocation module to create a printing group, the group management module 23 refers to the group management table and searches for a printing group satisfying the provided security requirements. If a printing group satisfying the security requirements already exists, the group management module 23 notifies, through the printing request determination module 21, the printing request transmission module 16 of the client terminal 10 of the information on the printer 30 having the security setting of the printing group.

If a printing group satisfying the provided security requirements does not exist, the group management module 23 refers to the device management table and selects a free printer 30 that can set the provided security requirements and that does not include a print job in execution at this point. The group management module 23 newly adds the printing group to the group management table and registers the selected printer 30. The group management module 23 notifies the printing request transmission module 16 of the information on the selected printer 30 through the printing request determination module 21. The group management module 23 further requests the printer setting change instruction module 24 to change the security setting of the selected printer 30. If there is no free printer 30 that can set the provided security requirements after referring to the device management table, the group management module 23 notifies the printing request transmission module 16 of the client terminal 10 of the fact that the allocation of the printer 30 is not possible and that the acquisition of the printing group has failed, through the printing request determination module 21.

The group management module 23 further monitors the print jobs accepted by the printing groups in all of the printing groups, and when a printing group is newly added, the group management module 23 starts monitoring the print jobs in the added printing group. When the printing process of all print jobs in a printing group including the waiting jobs is completed, the group management module 23 determines that the printing group is not necessary. The group management module 23 deletes the information on the printing group from the group management table and the device management table and removes the printing group.

Based on the request by the group management module 23 for changing the setting, the printer setting change instruction module 24 as an example of an instruction module instructs a printer setting changing module 32 of the printer 30 described later to change the setting so that the printer 30 satisfies the security requirements.

The print job distribution module 25 as an example of a forwarding module and a printing instruction transmission module receives the print job from the print job generation module 17 of the client terminal 10. If the deferment conditions are not set in the print job, the print job distribution module 25 forwards the print job to a print job reception module 31 of the printer 30 described later. On the other hand, if the deferment conditions are set in the print job, the print job distribution module 25 suspends forwarding the print job. The print job distribution module 25 stores the print job in the waiting job storage 26 as a waiting job and records the information on the waiting job in the waiting job management table. The waiting jobs are registered in the printing group, and after the completion of the printing process of the print jobs without the deferment conditions in the printing group, the waiting jobs are sequentially forwarded to the print job reception module 31.

The waiting job storage 26 stores the waiting jobs provided with the deferment conditions.

Next, a functional configuration of the printer 30 will be described. The printer 30 includes: the print job reception module 31 that receives the print job from the management server 20; the printer setting changing module 32 that changes the setting of the printer 30 based on the instruction for changing the setting; and a printing execution module 33 that executes the printing process based on the print job.

The print job reception module 31 receives the print job from the print job distribution module 25 of the management server 20 and outputs the received print job to the printing execution module 33 to instruct printing. When the printing process of the print job is completed in the printing execution module 33, the print job distribution module 25 is notified of the completion.

Based on the instruction for changing the setting by the printer setting change instruction module 24 of the management server 20, the printer setting changing module 32 changes the setting of the printer 30 to satisfy the security requirements.

The printing execution module 33 executes the printing process based on the print job acquired from the print job reception module 31 in the environment of the security setting set by the printer setting changing module 32.

Group Management Table

Next, the group management table stored in the management table storage 22 will be described. FIG. 3 is a diagram showing an example of the group management table according to an embodiment. Three printing groups are registered in the group management table shown in FIG. 3, and content of items "Group ID", "Owner", "Participant", "Security Setting", "Printer ID", "Waiting Job", and "Group Reservation" is recorded for each printing group.

The "Group ID" indicates identification information provided to each printing group to manage the printing group on the management server 20. The "Owner" indicates a user who has performed the operation for executing printing to create the printing group. The "Participant" indicates a user who has come to participate in an existing printing group later.

The "Security Setting" indicates setting of the security determined to be necessary for printing based on the security policy and indicates the current security setting of the printing group. An example of a setting item specified in the "Security Setting" includes a security level specified by IEEE (The Institute of Electrical and Electronics Engineers) 2600 that is an international standard related to information security. Furthermore, for the setting items of an HDD (Hard Disk Drive) of the printer 30, "Delete" for deleting the print job in the HDD after printing of the print job, "Encrypt" for encrypting the print job to save the print job in the printer 30, and the like are set, for example. In addition, for the setting items of the password level for printing, "No" indicating that the password is not necessary, "Min" for requesting a password with four numbers, "Med" for requesting a password with eight numbers and characters, "Max" for requesting a password with twelve or more numbers, characters, and symbols, and the like are set, for example.

Furthermore, for the setting of the printer 30, how to handle another print job transmitted from the client terminal 10 to the management server 20 after the security is set in the printer 30 is set, for example. For example, "Allow" for accepting another print job, "Allow Defer Only" for accepting only a print job with deferment conditions, "Deny" for not accepting another print job, "Deny neighbor" for not accepting another job including a neighboring printer 30, and the like are set. In this way, handling of a print job with deferment conditions and handling of a print job including a neighboring printer 30 may also be specified as the security requirements.

More specifically, the setting of "Deny neighbor" is used when the printer 30 allocated according to the allocation request from the client terminal 10 and another printer 30 around the printer 30 are registered in the same printing group. Examples of the other printer 30 in the surrounding include another printer 30 adjacent to the printer 30 and another printer 30 on the same floor as the printer 30. As a result of the registration of the other printer 30 in the surrounding in the same printing group, another print job is not transmitted to the other printer 30. This can prevent other people from approaching the printer 30 that performs printing. The range of the other printer 30 to be registered in the same printing group may be changed according to the confidential level of the document data.

The "Printer ID" indicates a printer ID of the printer 30 belonging to the printing group. The printer ID is identification information provided to each printer 30 to identify the printer 30. The current security setting of the printing group is reflected on the printer 30 belonging to the printing group. The "Waiting Job" indicates a job ID of the waiting job registered in the printing group. The job ID is unique identification information provided to each print job to identify the print job. The waiting job indicated here is stored in the waiting job storage 26.

The "Group Reservation" indicates reservation information when the printing group is reserved by designating hour, time, and the like. The printing group is reserved by, for example, the user declaring to occupy the printing group until the process of a plurality of print jobs is completed when the user inputs a plurality of print jobs together within a certain time or by the user designating the hour and time for occupying the printing group. For example, printing of a plurality of print jobs having the same set of security requirements may be uninterrupted using a group reservation. When confidential documents are periodically printed, such as when wage slips, financial statements, or test results are printed, the user may designate the hour or time in advance to reserve the printing group. However, the reservation is not limited to the designation of the hour and time, and any information may be used as long as the printing group can be occupied and used. When the user reserves the printing group, it is only necessary that the client terminal 10 request the allocation of the printer 30 once, and a print job generated while the printing group is reserved is transmitted to the same printer 30. While the printing group is reserved, the printing group does not accept a print job of another user or registers the print job as a waiting job, and the printer 30 allocated to the printing group is not allocated to another printing group.

The information on "Group ID", "Owner", "Security Setting", "Printer ID", and "Group Reservation" in the information on the group management table is recorded when the group management module 23 newly adds a printing group. The information on "Participant" is recorded when the allocation of the printer 30 is requested, and an already existing printing group is selected. The information on "Waiting Job" is recorded together when the print job distribution module 25 stores the waiting job in the waiting job storage 26.

Three printing groups with "Group ID" of RGN001, RGN002, and RGN003 are registered in the illustrated example. In the printing group of RGN001 for example, the owner is a user A using a PC "X", and there is no participant. In the current security setting of RGN001, the level of IEEE 2600 is "2600.2", the setting of HDD is "Delete" and "Encrypt", the setting of password level is "Max", and the setting for handling another print job is "Deny". Although whether the facsimile functions and the scan functions can be used is not specified in the security setting of the printing group of RGN001, "Function: disable fax/scanner" is set in the printing group of RGN003, and the facsimile functions and the scan functions cannot be used.

The printer 30 with the printer ID of MFP001 belongs to the printing group of RGN001, and a waiting job (job ID=Job401) created by a user C is registered as a waiting job. Although there is no reservation information in the printing group of RGN001, reservation information is recorded in the printing group of RGN003 for example, and the printing group of RGN003 is reserved from 13:00 to 15:00 on Feb. 15, 2014.

Device Management Table

Next, the device management table stored in the management table storage 22 will be described. FIG. 4 is a diagram showing an example of the device management table according to an embodiment. Six printers 30 are registered in the device management table shown in FIG. 4, and content of items "Printer ID", "Model Information", "Installation Location", "Group ID", "Executed Job", "Configurable Item", and "Multi-Functions" are recorded for each printer 30.

The "Printer ID" indicates a printer ID of the registered printer 30. The "Model Information" indicates information on a model of the printer 30. The "Installation Location" indicates a location that the printer 30 is installed. The "Group ID" indicates a group ID of the printing group including the printer 30. The "Executed Job" indicates a job ID of the print job transmitted from the management server 20 to the printer 30, that is, the print job being executed in the printing process by the printer 30. The print job registered in the "Executed Job" is deleted from the device management table when the printing process is completed in the printer 30.

The "Configurable Item" indicates security functions that can be set in the printer 30. For example, "N/A" for the HDD and the password level indicates that the there is no HDD for saving the print job and that there is no password setting function, respectively. The "Multi-Functions" indicates whether the facsimile functions and the scan functions can be used. Here, "enable" indicates that the functions can be used, "disable" indicates that the functions cannot be used, and "N/A" indicates that the printer 30 does not have the functions.

The user records the information on "Printer ID", "Model Information", "Installation Location", and "Configurable Item" when the printer 30 is installed, for example. The information on "Group ID" is recorded together when the group management module 23 newly adds a printing group. The information on "Executed Job" is recorded when the print job distribution module 25 transmits a print job without deferment conditions to the printer 30. The information on "Multi-Functions" may be recorded by the user or may be recorded by the management server 20 according to the setting status.

Six printers 30 with the printer ID of MFP001 to MFP006 are registered in the illustrated example. For example, the model of the printer 30 of MFP001 has a model number 0123-45678 manufactured by company A, and the installation location is office A, 7F, north side. The printer 30 of MFP001 belongs to the printing group of RGN001 and is executing two print jobs (job ID=Job001, Job002) created by the user A. The Printer 30 of MFP001 includes "Encrypt" and "Delete" for the HDD and "No", "Min", "Med", and "Max" for the password level in the items of security functions that can be set, and the facsimile functions and the scan functions can be used as multi-functions.

Waiting Job Management Table

Next, the waiting job management table stored in the management table storage 22 will be described. FIG. 5 is a diagram showing an example of the waiting job management table according to an embodiment. Three waiting jobs are registered in the waiting job management table shown in FIG. 5, and content of items "Job ID", "Security Requirements", and "Deferment Conditions" is recorded for each waiting job.

The "Job ID" indicates a job ID of the registered waiting job. The "Security Requirements" indicates security requirements necessary for printing the waiting job. The "Deferment Conditions" indicates deferment conditions set by the user for the waiting job, and the printing location, the waiting time, and the like that are conditions for the deferment are recorded. If printing is not performed within the waiting time, the waiting job is deleted from the waiting job storage 26 and the waiting job management table, and this is reported to the user.

Three waiting jobs with "Job ID" of Job201, Job301, and Job401 are registered in the illustrated example. For example, the waiting job of Job201 is a waiting job created by the user A. For the security requirements, it is requested to set the level of IEEE 2600 to "2600.2", set the HDD to "Delete" and "Encrypt", set the password level to "Max", and set the handling for other print jobs to "Deny". For the deferment conditions of the waiting job of Job201, it is set that any location (printer 30) for printing is possible and that the user tolerates if the time before the execution of printing is within 30 minutes.

Process by Client Terminal

Figure 6:
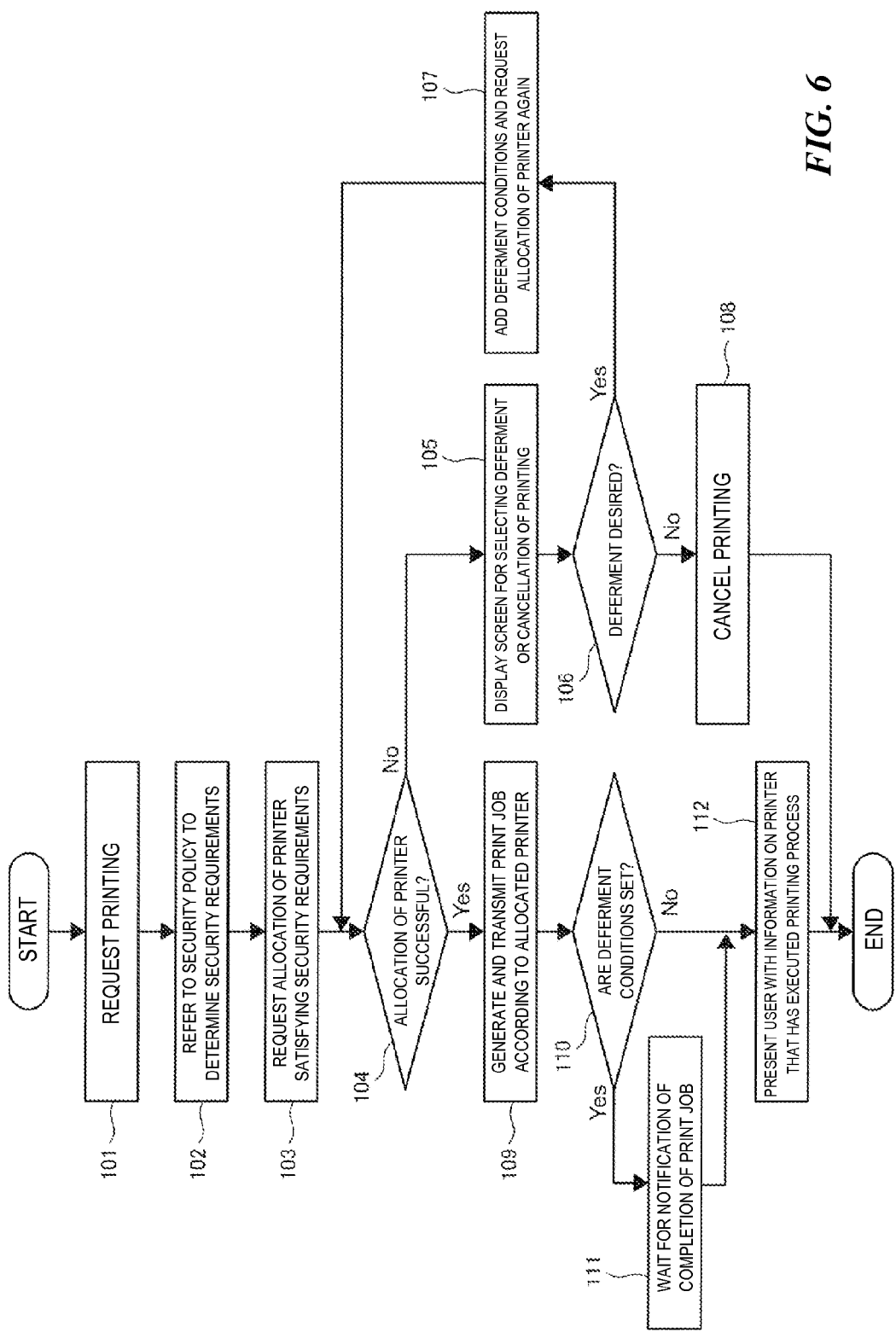
FIG. 6 is a flow chart showing an example of a procedure from acceptance of operation of printing execution by a client terminal to presentation of information on a printer that has executed printing to a user.

Next, a process by the client terminal 10 will be described. FIG. 6 is a flow chart showing an example of a procedure from acceptance of operation of printing execution by the client terminal 10 to presentation of information on the printer 30 that has executed printing to the user according to an embodiment.

First, when operation for executing printing is performed by activating the application 12 based on operation by the operation acceptance module 11, the application 12 outputs document data to the printing request acceptance module 13 and requests printing (step 101). When printing is requested, the printing request acceptance module 13 outputs the document data to the printing condition determination module 15 and asks the printing condition determination module 15 to determine printing conditions.

Next, the printing condition determination module 15 refers to the security policy stored in the policy storage 14 to determine the security requirements necessary for printing the document data (step 102). The printing request transmission module 16 requests the printing request determination module 21 of the management server 20 to allocate the printer 30 satisfying the security requirements obtained by the determination (step 103).

Next, as a result of the request to the printing request determination module 21, the printing request transmission module 16 determines whether the allocation of the printer 30 is successful (step 104). If a notification indicating that the allocation of the printer 30 is not possible and that the acquisition of the printing group has failed is received from the printing request determination module 21 (No in step 104), the printing request transmission module 16 causes the display module 18 to display the screen for the user to select one of deferment and cancellation of printing (step 105). The printing request transmission module 16 determines whether the user has performed operation for the deferment (step 106).

If the user has performed operation for deferring printing (Yes in step 106), the printing request transmission module 16 adds the deferment conditions based on the input by the user and again requests the printing request determination module 21 to allocate the printer 30 satisfying the security requirements (step 107) and moves to step 104. On the other hand, if the user has performed operation for cancelling printing instead of the operation for deferring printing (No in step 106), the printing request transmission module 16 determines to cancel printing (step 108), and the present processing flow ends.

If the determination is affirmative in step 104 (Yes), that is, if the information on the printer 30 is notified from the printing request determination module 21, it is determined that the allocation of the printer 30 is successful (Yes in step 104), and the printing request transmission module 16 asks the print job generation module 17 to generate a print job. Here, the printing request transmission module 16 outputs the information on the allocated printer 30 and the document data to the print job generation module 17. The print job generation module 17 generates a print job according to the allocated printer 30 and transmits the generated print job to the print job distribution module 25 of the management server 20 (step 109). In the present embodiment, step 109 is an example of a step of transmitting.

Next, the print job generation module 17 determines whether deferment conditions are set in the print job transmitted to the print job distribution module 25 (step 110). Here, if the deferment conditions are added in step 107, the print job generation module 17 determines that the deferment conditions are set in the print job. If the deferment conditions are set (Yes in step 110), the print job generation module 17 waits until reception of a notification of the completion of the printing process for the print job (waiting job) from the print job distribution module 25 (step 111).

When the notification of the completion of the printing process is received, the print job generation module 17 causes the display module 18 to display the position information and the like on the printer 30 that has executed the printing process (that is, allocated printer 30) to present the position information and the like to the user (step 112), and the present processing flow ends. On the other hand, if the deferment conditions are not set (No in step 110), the printing process of the print job is executed without deferment. Therefore, the process moves to step 112, and when the notification of the completion of the printing process is received, the print job generation module 17 presents the position information and the like on the printer 30 to the user. The present process flow ends.

In this way, the client terminal 10 determines the security requirements necessary for printing the document data and requests the management server 20 to allocate the printer 30 satisfying the security requirements. The client terminal 10 transmits the print job to the management server 20, and when the notification of the completion of the printing process is received, the client terminal 10 presents the information on the printer 30 that has executed the printing process to the user.

Process by Management Server

Figure 7:
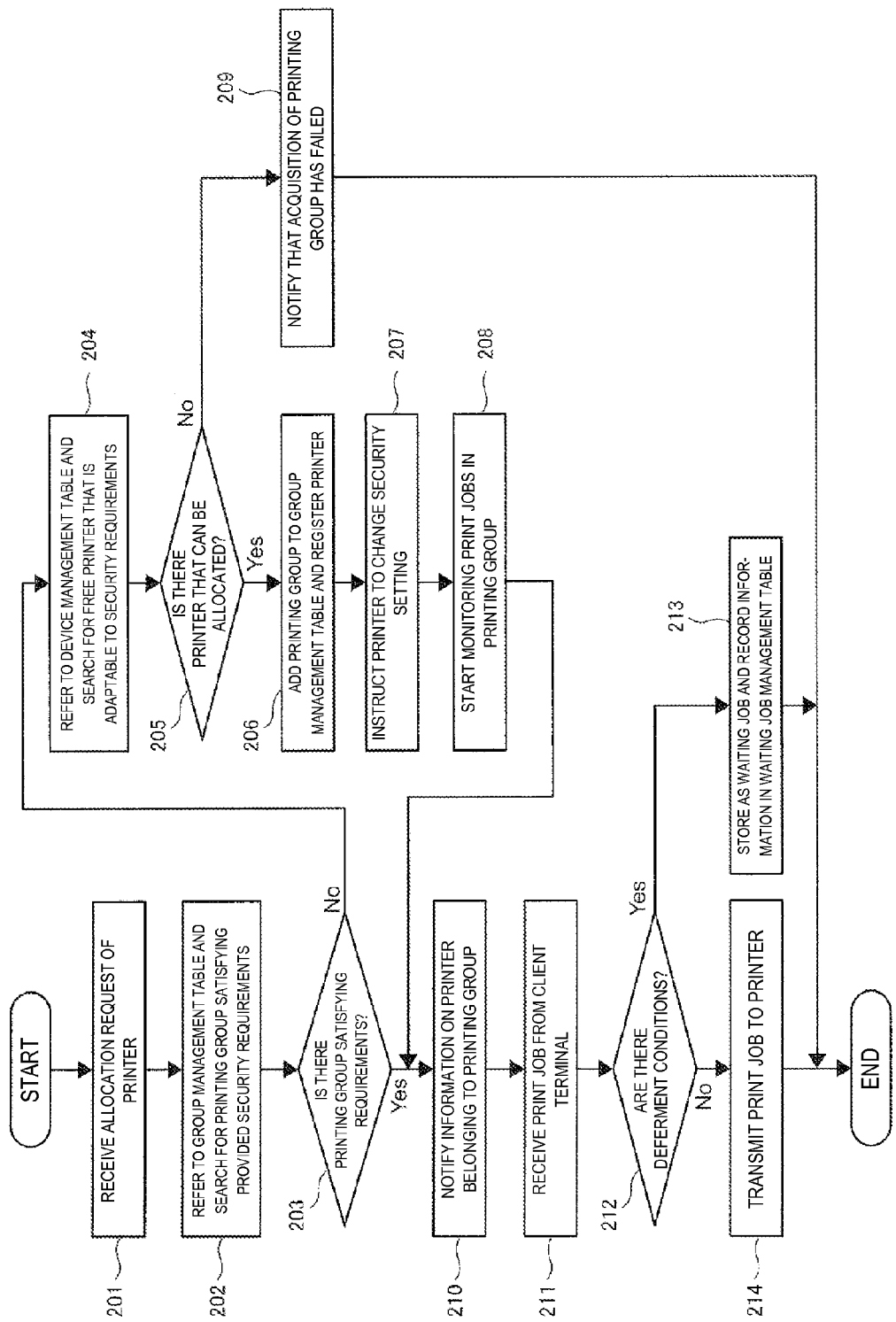
FIG. 7 is a flow chart showing an example of a procedure from reception of an allocation request of a printer by a management server to transmission of a print job to the printer.

Next, a process by the management server 20 will be described using FIGS. 7 and 8. FIG. 7 is a flow chart showing an example of a procedure from reception of an allocation request of the printer 30 by the management server 20 to transmission of a print job to the printer 30 according to an embodiment.

First, the printing request determination module 21 receives an allocation request of the printer 30 from the printing request transmission module 16 of the client terminal 10 (step 201). Here, the printing request determination module 21 receives the allocation request made in step 103 or step 107 of FIG. 6. The printing request determination module 21 asks the group management module 23 to create a printing group satisfying the security requirements provided in the allocation request.

Next, the group management module 23 refers to the group management table stored in the management table storage 22 and searches for a printing group satisfying the provided security requirements (step 202). The group management module 23 determines whether there is a printing group satisfying the provided security requirements (step 203). Here, the group management module 23 makes the determination based on the "Security Setting" and the "Group Reservation" of the group management table.

For example, even if there is a printing group satisfying the requirements in relation to the setting items of the level of IEEE 2600 and the HDD, the printing group does not accept another print job if "Deny" is set in the printing group, and it is not determined that the security requirements are satisfied. Even if the printing group satisfies the requirements in the item of "Security Setting", a negative determination (No) is made in step 203 if the printing group is occupied by reservation and does not accept another print job.

Furthermore, for example, if the allocation request from the client terminal 10 is a follow-up allocation request and is provided with deferment conditions, the group management module 23 also refers to the device management table to determine whether there is a printing group including the printer 30 that can set the security requirements. More specifically, the group management module 23 specifies a printer 30 that can set the security requirements of the waiting job among all of the printers 30 belonging to any of the printing groups. If the printer 30 that can set the security requirements of the waiting job belongs to any of the printing groups, the group management module 23 determines that there is a printing group satisfying the provided security requirements (Yes in step 203). Therefore, even if the acquisition of a printing group has failed in the previous allocation request, the follow-up allocation request increases the possibility of finding the printing group satisfying the security requirements.

Furthermore, for example, if the printer 30 for executing printing is designated in the deferment conditions, the group management module 23 determines whether the printing group including the designated printer 30 satisfies the security requirements. Furthermore, for example, if the waiting time is designated in the deferment conditions, the group management module 23 takes into account the number of waiting jobs, the reservation time, and the like of each printing group to determine whether there is a printing group satisfying the security requirements.

If there is no printing group satisfying the security requirements in step 203 (No in step 203), the group management module 23 refers to the device management table stored in the management table storage 22 and searches for a free printer 30 that can set the security requirements and that does not include a print job in execution at this point (step 204). The group management module 23 determines whether there is a free printer 30 that can set the security requirements, that is, a printer 30 that can be allocated in response to the allocation request (step 205). Here, whether the security requirements can be set is determined based on the "Configurable Item" in the device management table, and it is determined that the printer 30 is free if there is no print job recorded in the "Executed Job".

If there is a printer 30 that can be allocated (Yes in step 205), the group management module 23 adds a new printing group to the group management table and registers the printer 30 that can be allocated (step 206). Here, the group management module 23 may register one printer 30 or may register a plurality of printers 30 as the printers 30 registered in the printing group. The group management module 23 determines the number of printers 30 to be registered based on, for example, the number of free printers 30 that are adaptable to the security requirements, statistical information related to the past use, and the like. In the present embodiment, step 206 is an example of a step of allocating.

Next, the group management module 23 requests the printer setting change instruction module 24 to change the setting of the printer 30 that can be allocated. The printer setting change instruction module 24 instructs the printer setting changing module 32 of the printer 30 to change the security setting so that the printer 30 that can be allocated satisfies the security requirements (step 207). Here, if a plurality of printers 30 belong to the printing group, the printer setting changing module 32 may select one printer 30 according to conditions specified in advance to instruct the printer 30 to change the setting or may instruct a plurality of printers 30 to change the setting. In the present embodiment, step 207 is an example of a step of instructing. The group management module 23 starts monitoring the print jobs in a newly added printing group (step 208). The process then moves to step 210 described later. A procedure of monitoring the print jobs will be described in FIG. 8.

On the other hand, if the determination is negative (No) in step 205, that is, if there is no printer 30 that can be allocated (No in step 205), the group management module 23 notifies the printing request transmission module 16 of the client terminal 10 of the fact that the printer 30 cannot be allocated and that the acquisition of the printing group has failed, through the printing request determination module 21 (step 209). Based on the notification, the printing request transmission module 16 of the client terminal 10 determines that the allocation of the printer 30 has failed in step 104 of FIG. 6 and makes the user select deferment or cancellation of printing in step 105.

After monitoring of the print job is started in step 208 or if there is a printing group satisfying the security requirements in step 203 (Yes in step 203), the group management module 23 notifies the printing request transmission module 16 of the information on the printer 30 belonging to the printing group satisfying the security requirements (step 210). If a plurality of printers 30 belong to the printing group, the group management module 23 selects one of the plurality of printers 30 according to conditions specified in advance. Here, the group management module 23 selects one of the plurality of printers 30 closest from the user, for example. However, if there is an instruction for changing the setting in one printer 30 in step 207, the group management module 23 reports the information on the printer 30 in which the setting is changed. As a result of the notification of step 210, the printing request transmission module 16 of the client terminal 10 determines that the allocation of the printer 30 is successful in step 104 of FIG. 6, and the print job is generated in step 109. In the present embodiment, step 210 is an example of a step of allocating.

Next, the print job distribution module 25 receives the print job from the print job generation module 17 of the client terminal 10 (step 211). Here, the print job distribution module 25 receives the print job transmitted in step 109 of FIG. 6. The print job distribution module 25 determines whether deferment conditions are set in the received print job (step 212).

If the deferment conditions are set (Yes in step 212), the print job distribution module 25 stores the print job in the waiting job storage 26 as a waiting job and records the information on the waiting job in the waiting job management table and the group management table (step 213), and the present processing flow ends. The waiting job is stored when the allocation of the printer has failed in step 104 of FIG. 6, and the deferment conditions are added in step 107. The waiting job is registered in the printing group including the printer 30 specified in step 203, that is, the printer 30 specified to be able to set the security requirements of the waiting job.

On the other hand, if the deferment conditions are not set in step 212 (No in step 212), the print job distribution module 25 transmits the print job to the print job reception module 31 of the printer 30 (step 214). When a notification of the completion of the printing process for the print job is received from the printer 30, the print job distribution module 25 notifies the print job generation module 17 of the client terminal 10 of the completion. The present processing flow ends. In the present embodiment, step 214 is an example of a step of transmitting.

Although the group management module 23 refers to the group management table to search for the printing group satisfying the security requirements in step 202, the configuration is not limited to this. For example, if there are a large number of printers 30 that are not used based on the use status of the printers 30, the group management module 23 may add a new printing group as in step 206 without searching for a printing group.

Furthermore, if the determination is affirmative (Yes) in step 203, the management server 20 may make the owner of an existing printing group to select whether a participant can be newly added. For example, the owner of the printing group indicating RGN002 is a user B in the group management table shown in FIG. 3, and a user D and a user E are added as participants. When the user D or the user E is to be added as a participant, the management server 20 may alert a PC "Y" of the user B as the owner to select whether the participant can be added, for example.

If there is no printer 30 in the printing system 1 that can set the security requirements based on the functions of the printer 30 when the determination is negative in step 205 (No), the group management module 23 may notify the printing request transmission module 16 of the client terminal 10 of the fact that there is no printer 30 that can set the security requirements. Based on the notification, the printing request transmission module 16 of the client terminal 10 makes the user select whether to cancel printing or to change the security requirements, for example.

When the user prints document data that does not require the security function, after the allocation request of the printer 30, the group management module 23 in step 203 refers to the device management table to determine whether there is a printer 30 in which the security function is not validated. If there is a printer 30 in which the security function is not validated, printing is executed by the printer. On the other hand, if there is no printer 30 in which the security function is not validated, the client terminal 10 is notified of the fact that the printer 30 cannot be allocated.

In this way, the management server 20 searches for the printing group or the printer 30 satisfying the necessary security requirements in response to the allocation request of the printer 30 received from the client terminal 10 and notifies the client terminal 10 of the information on the printer 30 that can be allocated. If there is no printer 30 that can be allocated, the management server 20 notifies the client terminal 10 of the fact that the acquisition of the printing group has failed.

Figure 8:
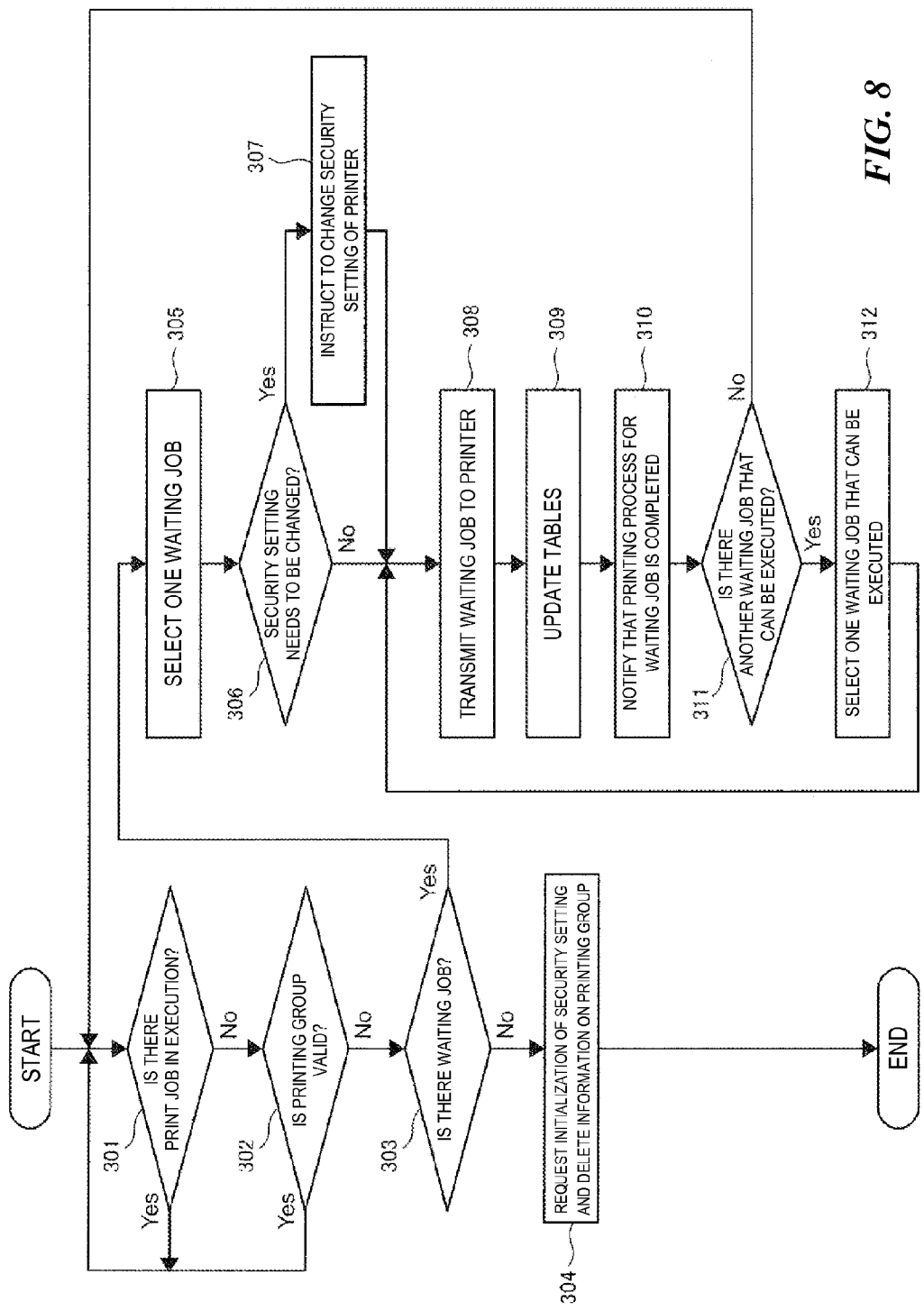
FIG. 8 is a flow chart showing an example of a procedure by the management server monitoring print jobs in a printing group.

FIG. 8 is a flow chart showing an example of a procedure by the management server 20 monitoring the print jobs in the printing group according to an embodiment. The process shown in FIG. 8 may be executed for each printing group.

First, after the monitoring in the printing group is started, the group management module 23 refers to the group management table and the device management table to determine whether there is a print job being executed by the printing process in the printer 30 among the print jobs in the printing group (step 301). Here, if there is a print job recorded in "Executed Job" of the device management table, it is determined that there is a print job in execution. If there is a print job in execution (Yes in step 301), the group management module 23 repeatedly executes the determination of step 301 until there is no more print job in execution.

On the other hand, if there is no print job in execution (No in step 301), the group management module 23 determines whether the printing group is valid (step 302). Here, if the printing group is reserved by designating the time or the like for example, the printing group is determined to be valid if it is within the period of the reservation, and the printing group is determined to be not valid if the period of the reservation has expired. The printing group is also determined to be not valid if the printing group is not reserved. If the printing group is valid (Yes in step 302), the process moves to step 301.

On the other hand, if the printing group is not valid (No in step 302), then the group management module 23 refers to the group management table to determine whether there is a waiting job in the printing group (step 303). Here, if the information on the waiting job is registered in step 213 of FIG. 7, and there is a print job recorded in "Waiting Job" of the group management table, it is determined that there is a waiting job. If there is no waiting job (No in step 303), the process for all print jobs in the printing group is completed. Therefore, the group management module 23 requests the printer setting change instruction module 24 to initialize the security setting of all printers 30 registered in the printing group and deletes the information on the printing group from the group management table and the device management table (step 304). The printer setting change instruction module 24 instructs the printer setting changing module 32 of the printer 30 to initialize the security setting, and the present processing flow ends.

On the other hand, if there is a waiting job in step 303 (Yes in step 303), the group management module 23 selects one waiting job (step 305). The group management module 23 refers to the group management table and the waiting job management table to determine whether the security setting needs to be changed to print the waiting job in the printer 30 specified in step 203 of FIG. 7, that is, the printer 30 specified to be able to set the security requirements of the selected waiting job (step 306). Here, the group management module 23 compares the content of "Security Setting" of the group management table and the content of "Security Requirements" of the waiting job recorded in the waiting job management table and determines that the security setting of the printer 30 needs to be changed if the contents are different.

If the security setting needs to be changed (Yes in step 306), the group management module 23 requests the printer setting change instruction module 24 to change the security setting of the specified printer 30. The printer setting change instruction module 24 instructs the printer setting changing module 32 of the specified printer 30 to change the security setting (step 307). If there are a plurality of printers 30 specified to be able to set the security requirements of the waiting job in the printing group, the printer setting change instruction module 24 selects one of the printers 30 according to the conditions specified in advance and instructs the selected printer 30 to change the setting. In the present embodiment, step 307 is an example of a step of instructing.

After the change in the security setting is instructed in step 307 or if the change in the security setting is not necessary in step 306 (No in step 306), the print job distribution module 25 acquires the waiting job selected in step 305 from the waiting job storage 26 and transmits the waiting job to the specified printer 30 (step 308). In the present embodiment, step 308 is an example of a step of transmitting. The group management module 23 updates the information in the tables (group management table and waiting job management table) based on the transmission of the waiting job (step 309). Here, if the waiting job transmitted to the printer 30 is also registered in another printing group, the information on the waiting job is deleted.

Next, when a notification of the completion of the printing process for the waiting job is received from the printer 30, the print job distribution module 25 notifies the print job generation module 17 of the client terminal 10 of the completion (step 310). Here, the print job generation module 17 waits until the reception of the notification of the completion of the waiting job as in step 111 of FIG. 6, and when the notification of the completion of step 310 is received, the print job generation module 17 presents the information on the printer 30 to the user as in step 112.

Next, the group management module 23 determines whether there is another waiting job for which the printing process can be executed among the waiting jobs registered in the printing group, without changing the setting of the printer 30 at the destination of the transmission of the waiting job in step 308 (step 311). If there is another waiting job that can be executed (Yes in step 311), the group management module 23 selects one waiting job that can be executed (step 312) and moves to step 308. On the other hand, if there is no other waiting job that can be executed (No in step 311), the process moves to step 301.

In step 307, if the printing group includes a printer 30 not used for printing the waiting jobs including the other waiting jobs, the printer setting change instruction module 24 may release the printer 30 (remove from the printing group) before removing the printing group.

In this way, the management server 20 monitors the print jobs in the printing group for each of the printing groups. The management server 20 removes the printing group when the printing process is completed for all print jobs in the printing group including the waiting jobs.

Examples of Screens Displayed on Display Module

Next, screens displayed on the display module 18 will be described. FIGS. 9(a) to 9(d) are diagrams showing examples of the screens displayed on the display module 18.

Figure 9:
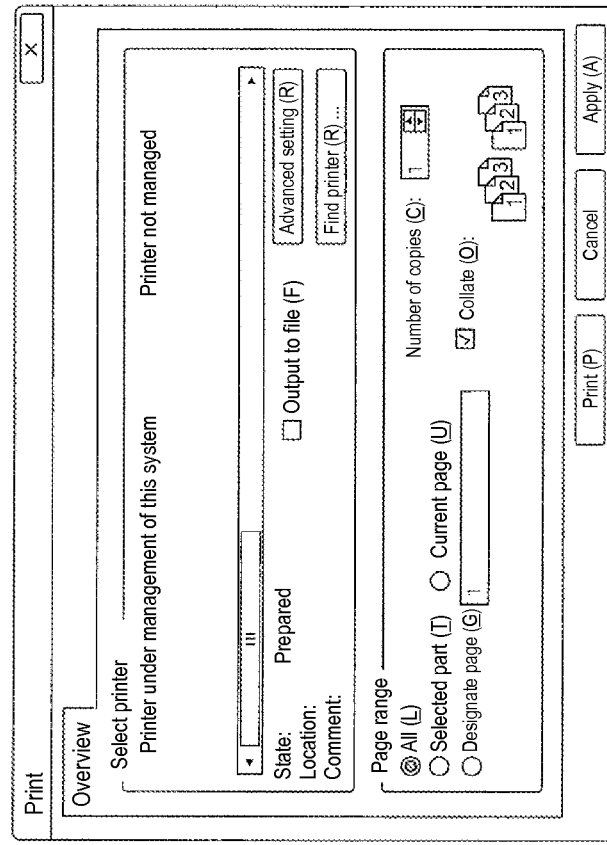
FIGS. 9(a) to 9(d) are diagrams showing examples of screens displayed on a display module.

The screen shown in FIG. 9(a) is a screen displayed by the application 12 and is a screen for accepting operation for executing printing from the user according to an embodiment. For example, the user selects "Printer under management of this system" and further selects a print button 51 to perform the operation for executing printing. The application 12 outputs the document data to be printed to the printing request acceptance module 13 and requests printing. In this way, the user does not designate the printer 30 that executes printing, and the management server 20 assigns the printer 30 in the present embodiment. However, the user may be able to optionally designate the printer 30 that performs printing.

The screen shown in FIG. 9(b) is a screen for the user to select deferment or cancellation of printing, and the screen is displayed when the allocation of the printer 30 has failed in step 104 of FIG. 6 according to an embodiment. The screen shown in FIG. 9(b) displays a message "Printer that can satisfy security requirements of this document is not found", indicating that the allocation of the printer 30 has failed, and displays a deferment button 52 and a cancellation button 53. The user can select deferment or cancellation of printing through the deferment button 52 or the cancellation button 53.

The screen shown in FIG. 9(c) is a screen for designating conditions for deferring printing and is displayed when, for example, the user selects the deferment button 52 shown in FIG. 9(b) in step 106 of FIG. 6 according to an embodiment. In the screen shown in FIG. 9(c), the user can input the waiting time and the printing location. In the illustrated example, "30 minutes" is input for the waiting time, and the printer 30 of "MFP001" is input for the printing location. The number of print jobs in the printing group (=12) and the reservation time set in the printing group (=15 more minutes) are displayed as information on the printing group including the designated printer 30 of "MFP001". The number of print jobs displayed here is a sum of the print jobs being executed by the printer 30 and the waiting jobs. Although the reservation time of the printing group is displayed here, estimated time of the completion of the printing process for all print jobs in the printing group may be displayed in addition to the reservation time.

The screen shown in FIG. 9(d) is a screen showing information on the printer 30 that has executed the printing process and is displayed to present the user with the information on the printer 30 in step 112 of FIG. 6 according to an embodiment. More specifically, after the operation for executing printing is performed on the screen shown in FIG. 9(a), the screen shown in FIG. 9(d) is displayed when printing is performed after successful allocation of the printer 30. Furthermore, after the operation for executing printing is performed on the screen shown in FIG. 9(a), the screen shown in FIG. 9(d) is displayed when printing is performed for the waiting job by inputting conditions on the screen shown in FIG. 9(c) after the failure of the allocation of the printer 30. In the screen shown in FIG. 9(d), the printer ID of the printer 30 that has executed printing and the installation location of the printer 30 are displayed. In the illustrated example, printing is executed by the printer 30 of "MFP001", and the installation location of the printer 30 of "MFP001" is displayed as "Office A, 7F, north side".

As described, the printing system 1 according to the present embodiment allocates the printer 30 according to the security functions of the printer 30 or according to the actual setting content so that printing is performed under the security requirements necessary for printing. The content of the security setting of the printer 30 is not fixed, and the setting is changed according to the document data to be printed if necessary. Therefore, the printing system 1 according to the present embodiment enables printing under the security requirements necessary for printing and suppresses the reduction in the use efficiency of the printer 30.

Although the client terminal 10 determines the security requirements based on the security policy defined in advance by the system administrator or the like in the present embodiment, the client terminal 10 may determine the security requirements based on a request by the user upon execution of printing, for example.

Furthermore, although the client terminal 10 displays the screen for the user to select deferment or cancellation of printing when the allocation of the printer 30 has failed in the present embodiment, the configuration is not limited to this. For example, the client terminal 10 may request the user to change the security requirements and may again request the management server 20 to allocate the printer 30 satisfying the changed security requirements.

In the present embodiment, the user may be able to further select optional conditions as conditions for specifying the environment for printing, in the operation for executing printing. An example of the optional conditions includes allowing the user to select one of deferment of printing until printing is possible in the printer 30 near the user and printing by the printer 30 at a location away from the user, when printing is not possible in the printer 30 near the user because the location of the printer 30 allocated to the printing group is not close to the user. A printer that is near the user is in close physical proximity to the user. When the user selects the optional conditions, the printing request transmission module 16 adds the content of the optional conditions and requests the allocation of the printer 30. The group management module 23 takes into account the content of the added optional conditions to search the printing group or the printer 30 satisfying the security requirements.

Hardware Configuration Example

Figure 10:
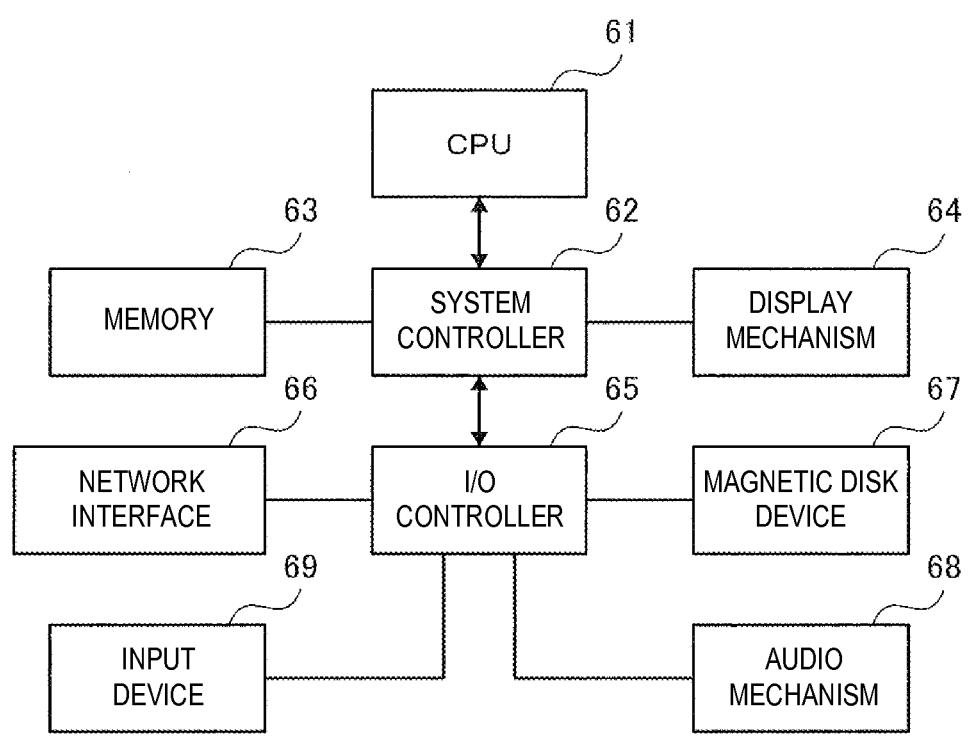
FIG. 10 is a diagram showing an example of a hardware configuration of the management server.

Lastly, a hardware configuration suitable for forming the client terminal 10, the management server 20, or both of the present embodiment will be described. FIG. 10 is a diagram showing an example of the hardware configuration of the management server 20 according to an embodiment. An application to a computer will be described here. The computer shown in FIG. 10 includes a CPU (Central Processing module) 61 as computation means and a memory 63 as main storage means. The computer further includes, as external devices: a display mechanism 64 including a display apparatus; a network interface 66; a magnetic disk device (HDD) 67; an audio mechanism 68; an input device 69 such as a keyboard and a mouse; and the like.

In the configuration example shown in FIG. 10, the memory 63 and the display mechanism 64 are connected to the CPU 61 through a system controller 62. The network interface 66, the magnetic disk device 67, the audio mechanism 68, and the input device 69 are connected to the system controller 62 through an I/O controller 65. The constituent elements are connected by various buses, such as a system bus and an input/output bus.

In FIG. 10, a program of an OS and an application program are stored in the magnetic disk device 67. The programs are loaded on the memory 63 and executed by the CPU 61 to implement the functions of the printing request determination module 21, the group management module 23, the printer setting change instruction module 24, the print job distribution module 25, and the like of the management server 20 in the present embodiment. The management table storage 22 and the waiting job storage 26 are implemented by storage means, such as the memory 63 and the magnetic disk device 67, for example.

Other than storing the programs executed by the CPU 61 in the magnetic disk device 67 in advance, the programs can be stored in a storage medium such as a CD-ROM and provided to the CPU 61, or the programs can be provided to the CPU 61 through the network interface 66, for example.

FIG. 10 just illustrates a hardware configuration of a computer suitable for the application of the present embodiment, and the present embodiment is implemented not only by the illustrated configuration. The hardware configuration of the client terminal 10 shown in FIG. 1 is common to the hardware configuration of the management server 20. As in the management server 20, the CPU 61 executes the programs for implementing the functions of the client terminal 10 to implement the functions of the client terminal 10.

Although the client terminal 10 and the management server 20 are separately arranged in the present embodiment, each client terminal 10 may implement the functions of the management server 20. According to the configuration, the client terminal 10 acquires the information and the like in the tables held by the other client terminals 10 when the user performs operation for executing printing, for example. In this way, a plurality of client terminals 10 share the information to advance the process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for securely printing a document, the method comprising:
   receiving, by a server computer, a request from a client computer to allocate a printer;
   detecting, by the server computer, a keyword in the received request, wherein the detected keyword indicates the document contains confidential information;
   determining, by the server computer, a set of security requirements for the document based on the detected keyword;
   generating, by the server computer, a printing group comprising one or more printers that will print document data according to the determined set of security requirements, wherein the one or more printers are accessible by the client computer;
   allocating, by the server computer, a printer from the printing group, based on a determination by the server computer;
   transmitting to the client computer, by the server computer, an identification of the allocated printer;
   transmitting to the allocated printer, by the server computer, the determined set of security requirements;
   receiving from the client computer, by the server computer, a printing instruction including document data for printing to the allocated printer; and
   transmitting to the allocated printer, by the server computer, the received document data to print.

2. The method of claim 1, wherein receiving from the client computer, by the server computer, a printing instruction for printing document data to the allocated printer comprises:
   receiving the printing instruction from the client computer with deferment conditions based on a determination that the allocated printer does not satisfy the security requirements; and
   storing, by the server computer, the printing instruction without transmitting the received document data to the allocated printer.

3. The method of claim 1, further comprising:
   removing the printing group when printing is completed for all printing instructions accepted by the printing group, and
   instructing the allocated printer to initialize security settings when the group is removed.

4. The method of claim 1, further comprising:
   maintaining uninterrupted printing of a plurality of document data comprising the same set of security requirements by any printer allocated from the printing group based on a reservation status of the printing group.

5. The method of claim 1, further comprising:
   allocating, by the server computer, another printer from the printing group physically located in close proximity to the allocated printer, also accessible by the client computer, and also satisfying the set of security requirements.

6. The method of claim 1, further comprising:
   receiving from the client computer, by the server computer, acknowledgement of the allocation of a printer in a different physical location than the client computer.

7. A method for securely printing a document, the method comprising:
   receiving, by a server computer, a request from a client computer to allocate a printer;

detecting, by the server computer, a keyword in the received request, wherein the detected keyword indicates the document contains confidential information;

determining, by the server computer, a set of security requirements for the document, based on the detected keyword;

generating, by the server computer, a printing group comprising one or more printers that will print document data according to the determined set of security requirements, wherein the one or more printers are accessible by the client computer;

allocating, by the server computer, a printer from the printing group, based on a determination by the server computer;

transmitting to the allocated printer, by the server computer, the determined set of security requirements;

receiving from the client computer, by the server computer, a printing instruction including document data for printing to the allocated printer;

transmitting to the allocated printer, by the server computer, the received document data to print; and receiving from the allocated printer, by the server computer, a notification of completion of printing of the received document data.

8. The method of claim 7, wherein receiving from the client computer, by the server computer, a printing instruction for printing document data to the allocated printer comprises:

receiving the printing instruction from the client computer with deferment conditions based on a determination that the allocated printer does not satisfy the security requirements; and storing, by the server computer, the printing instruction without transmitting the received document data to the allocated printer.

9. The method of claim 7, further comprising:

removing the printing group when printing is completed for all printing instructions accepted by the printing group, and instructing the allocated printer to initialize security settings when the group is removed.

10. The method of claim 7, further comprising:

maintaining uninterrupted printing of a plurality of document data comprising the same set of security requirements by any printer allocated from the printing group based on a reservation status of the printing group.

11. The method of claim 7, further comprising:

allocating, by the server computer, another printer from the printing group physically located in close proximity to the allocated printer, also accessible by the client computer, and also satisfying the set of security requirements.

12. The method of claim 11, further comprising:

receiving from the client computer, by the server computer, acknowledgement of the allocation of a printer in a different physical location than the client computer.

13. The method of claim 7 further comprising:

transmitting to the client computer, by the server computer, the received notification of completion of printing of the transmitted document data.

14. The method of claim 7 further comprising:

transmitting to the client computer, by the server computer, an identification of the allocated printer.

15. The method of claim 14, wherein receiving from the client computer, by the server computer, a printing instruction for printing document data to the allocated printer comprises:

receiving the printing instruction from the client computer with deferment conditions based on a determination that the allocated printer does not satisfy the security requirements; and storing, by the server computer, the printing instruction without transmitting the received document data to the allocated printer.

16. A method for securely printing a document, the method comprising:

receiving, by a server computer, a request from a client computer to allocate a printer;

detecting, by the server computer, a keyword in the received request, wherein the detected keyword indicates the document contains confidential information;

determining, by the server computer, a set of security requirements for the document, based on the detected keyword;

generating, by the server computer, a printing group comprising one or more printers that will print document data according to the determined set of security requirements, wherein the one or more printers are accessible by the client computer;

allocating, by the server computer, a printer from the printing group, based on a determination by the server computer;

transmitting to the allocated printer, by the server computer, the determined set of security requirements;

receiving from the client computer, by the server computer, a printing instruction including document data for printing to the allocated printer; and restricting, by the server computer, receiving the document data if a printing group satisfying the determined set of security requirements is not generated.

17. The method of claim 16, further comprising:

removing the printing group when printing is completed for all printing instructions accepted by the printing group, and instructing the allocated printer to initialize security settings when the group is removed.

18. The method of claim 16, further comprising:

maintaining uninterrupted printing of a plurality of document data comprising the same set of security requirements by any printer allocated from the printing group based on a reservation status of the printing group.

19. The method of claim 16, further comprising:

allocating, by the server computer, another printer from the printing group physically located in close proximity to the allocated printer, also accessible by the client computer, and also satisfying the set of security requirements.

20. The method of claim 19, further comprising:

receiving from the client computer, by the server computer, acknowledgement of the allocation of a printer in a different physical location than the client computer.

* * * * *